United States Patent [19]

Steiger

[11] 3,925,159

[45] Dec. 9, 1975

[54] BIOLOGICAL INDICATOR AND METHOD FOR ITS PRODUCTION

[75] Inventor: Eberhard Steiger, Leipzig, Germany

[73] Assignee: VEB Kombinat Medizin-und Labortechnik Leipzig, Leipzig, Germany

[22] Filed: Jan. 30, 1974

[21] Appl. No.: 438,058

Related U.S. Application Data

[63] Continuation-in-part of Ser. No. 367,988, June 7, 1973.

[52] U.S. Cl. ............................ 195/73; 195/103.5 R
[51] Int. Cl.² ................................................. C12K 1/04
[58] Field of Search ......... 195/100, 103.5, 127, 73, 195/75, 65, 74; 426/61

[56] References Cited
UNITED STATES PATENTS 3,072,538   1/1963   Baptist .................. 195/101
3,585,112   6/1971   Ernst ..................... 195/103.5 R Primary Examiner—A. Louis Monacell
Assistant Examiner—R. B. Penland
Attorney, Agent, or Firm—Nolte and Nolte

[57] ABSTRACT

Method for the preparation of a biological indicator for the reproducible control of the conducting of chemical sterilizations, comprising suspending a spore soil in a liquid at a ratio of at least 1.5 ml. of the liquid per g. of the soil, separating the solid constituents from the suspension thereby to obtain a biotope-free germ suspension, concentrating the germ suspension and drying the germ suspension.

10 Claims, No Drawings

BIOLOGICAL INDICATOR AND METHOD FOR ITS PRODUCTION

This is a continuation-in-part of patent application Ser. No. 367,988, filed June 7, 1973.

This invention relates to a method for the preparation of a biological indicator.

Biological indicators according to the parent application used for the reproducible control of the conducting of chemical sterilizations always have a higher resistance for safety reasons than is required in practice under the most unfavorable conditions. Therefore, a germ suspension is used for the testing which has a germ count with a reference value of $10^6$ germs per biological indicator, which is sufficient, since the number of germs in the objects to be sterilized, for example, medical instruments, is several orders of magnitude below this reference value.

As described in the parent application, for the production of the biological indicator the spore soil is suspended in known manner so that the native germs are separated from their biotope. After the solid component of the spore soil suspension have been separated, the germ suspension contains generally no more than 6000 germs per ml. This means that approximately 150 ml. of the germ suspension would have to be pipetted into the receiver provided as a germ carrier and then be dried. But the receiver in the form of a plastic tube the capacity of which is predetermined by its length, outside diameter and wall thickness, can receive only 0.1 ml. of germ suspension, so that the pipetting and drying operation would have to be repeated 1500 times to arrive at a reference value of $10^6$ germs per biological indicator. Apart from the error possibilities, this procedure requires a practically unjustifiable energy expenditure to obtain a concentration of $10^6$ germs in a plastic tube.

An exception is the use of the biological indicator for routine tests. To this end is has already been suggested to determine the resistance of the indicator, starting from the above mentioned reference value, when it is prepared with a smaller number of germs. But then the resistance must be increased again to the reference value by means of the above described methods.

An object of the invention is to simplify the above referred to method for the production of the biological indicator and, more particularly, to develop a new method which provides with sufficient accuracy a germ count of $10^6$ per indicator. Other objects and advantages of the invention will become apparent from the following description.

According to the invention, at least 1.5 ml. liquid per g. spore soil is used for the production of the spore soil suspension. In the following step the suspended spore soil is filtered, that is, the suspension medium is separated from the soil components, and subsequently the filtered germ suspension is conducted through a bacteria filter.

The germs retained in the bacteria filter are then detached from the filter in a substantially smaller amount of liquid by subjecting the filter to a suspension process. From the volume of the filtered unconcentrated germ suspension and the number of germs therein per unit volume, the amount of liquid necessary to detach the germs from the bacteria filter, for example, if a germ concentration of $10^6$ germs per 0.1 ml. is to be obtained in the suspension, can be calculated.

Alternatively, in order to obtain a high germ concentration in the suspension, the still unconcentrated germ suspension is centrifuged. The sediment obtained is collected and the number of germs contained therein is determined in known manner. If deviations from the desired germ concentration are found, the sediment is diluted if the germ count is too high or it is centrifuged again if the number of germs is too low.

If a liquid with a low boiling point is used for the suspension of the spore soil, for example, acetone or ethyl alcohol, and it is necessary to increase the number of germs per unit of volume, the suspension can be concentrated by evaporation according to the invention. This step should be carried out, if possible, in a vacuum.

Moreover, according to another aspect of the method of the invention, instead of pipetting the germ suspension into the plastic tube, a rod of absorbent material is dipped into the germ suspension. The size and shape of the rod determines the amount of suspension absorbed and, thus, the number of germs contained therein.

The method for the production of the biological indicator can be concluded by either first drying the rod with the absorbed germ suspension and then placing the rod in the plastic tube or by first introducing the rod into the plastic tube and then drying it together with the latter.

The following examples illustrate the invention.

EXAMPLE 1

The spore soil is suspended in acetone, ethyl alcohol, distilled water, sodium chloride solution or other suitable medium, the ratio of liquid to spore soil being 1.5 ml:1 g. Then this suspension medium is filtered and separated from its solid constituents. The filtrate, which is a germ suspension, is conducted through a bacteria filter on which the germs are retained. Subsequently, the germs are detached from the bacteria filter in a very small amount of liquid. The amount of liquid necessary for the detachment of the germs is calculated from the desired number of germs per ml. and from the quantity of and germ concentration in the filtered and still unconcentrated germ suspension.

EXAMPLE 2

After the suspension process of Example 1, the unconcentrated germ suspension is centrifuged and the sediment thus obtained is collected. The number of germs contained therein is determined in known manner.

If deviations from the desired germ concentration are found, the sediment must be diluted if the germ concentration is too high or centrifuged again if it is too low.

EXAMPLE 3

If a liquid with a low boiling point is used in the suspension of the spore earth according to Examples 1 and 2, which is the case, for example, if acetone or ethyl alcohol are used, and if the number of germs per unit of volume is too low, the suspension is reduced by evaporation under vacuum.

EXAMPLE 4

For the production of the biological indicator, a rod of absorbent material, such as cotton wool, cellulose is dipped into the germ suspension obtained according to Examples 1 or 2, if necessary in combination with Example 3. This rod is so designed in size and shape that the amount of suspension absorbed, and thus the number of germs contained therein, is determined by it.

Of course, as in the parent application, the germs may be exposed to a subliminal dose of the agent to be used in the chemical sterilization whereby the resistance of the germs to the agent is increased, to provide an extra safety margin.

The rod with the absorbed suspension is dried and introduced into a polyvinyl chloride tube 40 mm. in length, 4 mm. in external diameter and 0.7 mm. in wall thickness. Alternatively, the rod with the absorbed germ suspension is first introduced into the plastic tube and then dried.

What is claimed is:

1. Method for the preparation of a biological indicator for the reproducible control of the conducting of chemical sterilizations, comprising suspending a spore soil in a liquid at a ratio of at least 1.5 ml. of the liquid per g. of the soil, separating the solid constituents from the suspension thereby to obtain a biotope-free germ suspension having a germ concentration no greater than 6000 germs per ml., concentrating the germ suspension to a concentration of at least $10^6$ germs per ml. while the germ suspension is not yet packaged, packaging the germ suspension and drying the germ suspension.

2. Method according to claim 1, in which the concentrating of the germ suspension comprises filtering the suspension through a bacteria filter and contacting the bacteria filter now having bacteria attached thereto with a quantity of a liquid for resuspending the bacteria at a concentration of at least $10^6$ germs per ml.

3. Method according to claim 1, in which the concentrating of the germ suspension comprises centrifuging the suspension.

4. Method according to claim 1, in which the concentrating of the solution includes evaporating of a portion of the liquid.

5. Method according to claim 4, in which the evaporating is conducted under vacuum.

6. Method according to claim 1, in which the concentrated suspension is introduced into and sealed in a germ impermeable, chemical sterilant permeable plastic tube.

7. Method according to claim 6, in which a rod of absorbent material is dipped into the concentrated suspension thereby to absorb the suspension and the concentrated suspension as absorbed in the rod is introduced into and sealed in the plastic tube.

8. Method according to claim 7, in which the concentrated suspension is dried after being introduced into the tube.

9. Method according to claim 8, in which the concentrated suspension is dried after being introduced into the tube.

10. Method according to claim 8, further comprising exposing the germs to a subliminal dose of the agent to be used in the chemical sterilization and, thereby, increasing the resistance of the germs to the agent.

* * * * *